United States Patent
Jeng et al.

(10) Patent No.: US 9,783,101 B2
(45) Date of Patent: Oct. 10, 2017

(54) VEHICLE TURNING ALARM METHOD AND VEHICLE TURNING ALARM DEVICE

(71) Applicant: Industrial Technology Research Institute, Hsinchu (TW)

(72) Inventors: An-Kai Jeng, Hsinchu (TW); Min-Te Sun, Hsinchu (TW); Yu-Chang Ho, Yilan County (TW); Pei-Chen Lee, New Taipei (TW); Hsin-Yu Yeh, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 9 days.

(21) Appl. No.: 15/052,900

(22) Filed: Feb. 25, 2016

(65) Prior Publication Data

US 2017/0166113 A1 Jun. 15, 2017

(30) Foreign Application Priority Data

Dec. 9, 2015 (TW) .............................. 104141285 A

(51) Int. Cl.
*B60Q 1/34* (2006.01)
(52) U.S. Cl.
CPC ................................... *B60Q 1/346* (2013.01)
(58) Field of Classification Search
CPC combination set(s) only.
See application file for complete search history.

(56) References Cited

U.S. PATENT DOCUMENTS

| 6,624,782 | B2 * | 9/2003 | Jocoy | G01S 13/931 |
| | | | | 342/195 |
| 6,827,522 | B2 * | 12/2004 | Kodama | G08G 1/162 |
| | | | | 404/72 |
| 7,002,458 | B2 | 2/2006 | Su | |
| 7,174,153 | B2 | 2/2007 | Ehlers | |
| 8,346,468 | B2 | 1/2013 | Emanuel et al. | |
| 8,378,805 | B2 | 2/2013 | Au et al. | |
| 8,436,751 | B2 | 5/2013 | Haran | |
| 8,478,642 | B2 | 7/2013 | Dey et al. | |
| 8,990,001 | B2 * | 3/2015 | Goudy | G08G 1/166 |
| | | | | 340/436 |

(Continued)

FOREIGN PATENT DOCUMENTS

| CN | 103164986 | 6/2013 |
| CN | 203793212 | 8/2014 |

(Continued)

OTHER PUBLICATIONS

"Search Report of European Counterpart Application," dated Apr. 10, 2017, p. 1-p. 7, in which the listed references were cited.

(Continued)

*Primary Examiner* — Travis Hunnings
(74) *Attorney, Agent, or Firm* — Jianq Chyun IP Office

(57) ABSTRACT

A vehicle turning alarm method and a vehicle turning alarm device are provided herein. The vehicle turning alarm method includes acquiring map information and vehicle information. The vehicle turning alarm method further includes determining a vehicle status according to the map information and the vehicle information when a vehicle approaches an intersection. The vehicle turning alarm method further includes not sending an alert message if the vehicle status is not a left-turning event.

18 Claims, 8 Drawing Sheets

(56) References Cited

U.S. PATENT DOCUMENTS

| | | | |
|---|---|---|---|
| 9,020,728 B2* | 4/2015 | Goudy | G08G 1/161 701/70 |
| 2005/0046597 A1* | 3/2005 | Hutchison | G08G 1/07 340/917 |
| 2012/0239286 A1 | 9/2012 | Mizuguchi | |
| 2013/0082874 A1 | 4/2013 | Zhang | |
| 2014/0200782 A1* | 7/2014 | Goudy | G08G 1/161 701/70 |

FOREIGN PATENT DOCUMENTS

| | | |
|---|---|---|
| EP | 2017125 | 1/2009 |
| EP | 2216755 | 8/2010 |
| TW | 200613167 | 5/2006 |
| TW | I260560 | 8/2006 |
| TW | M404803 | 6/2011 |
| TW | 201420399 | 6/2014 |
| TW | M485173 | 9/2014 |

OTHER PUBLICATIONS

Yao et al., "Learning Lane Change Trajectories From on-road Driving Data," 2012 Intelligent Vehicles Symposium, Jun. 2012, pp. 885-890.

Eren et al., "Estimating Driving Behavior by a Smartphone," 2012 Intelligent Vehicles Symposium, Jun. 2012, pp. 234-239.

Johnson et al., "Driving Style Recognition Using a Smartphone as a Sensor Platform," 2011 14th International IEEE Conference on Intelligent Transportation Systems, Oct. 2011, pp. 1609-1615.

Toledo-Moreo et al., "IMM-Based Lane-Change Prediction in Highways With Low-Cost GPS/INS," IEEE Transactions on Intelligent Transportation Systems, Mar. 2009, pp. 180-185.

Dai et al., "Mobile Phone Based Drunk Driving Detection," 2010 4th International Conference on Pervasive Computing Technologies for Healthcare, Mar. 2010, pp. 1-8.

"Office Action of Taiwan Counterpart Application", dated Jul. 27, 2016, p. 1-p. 4, in which the listed references were cited.

* cited by examiner

VEHICLE TURNING ALARM METHOD AND VEHICLE TURNING ALARM DEVICE

CROSS-REFERENCE TO RELATED APPLICATION

This application claims the priority benefit of Taiwan application no. 104141285, filed on Dec. 9, 2015. The entirety of the above-mentioned patent application is hereby incorporated by reference herein and made a part of this specification.

TECHNICAL FIELD

The disclosure relates to a vehicle turning alarm method and a vehicle turning alarm device.

BACKGROUND

Recently, vehicle-to-vehicle (V2V) communications have become one of the practical and popular technologies frequently applied in vehicle safety systems. The V2V technology includes but is not limited to intersection movement assistance (IMA), emergency electronic brake lights (EEBL), left-turn assistant (LTA), and forward collision warning (FCW). Among the causes of traffic accidents in recent years, distracted driving resulting from drivers whose attention is diverted from the road is the top cause, and the second and third causes are failure to yield in accordance with relevant regulations and drunk driving. The LTA technology alerts the drivers to other vehicles coming up in the blind spots as well as lowers the incidence rate of the traffic accidents caused by distracted driving.

The LTA can be categorized into a front LTA and a rear LTA. The front LTA can transmit a turn signal through a controller area network (CAN) bus to detect a driver's intent to make turns. When the driver turns on the left-turn signal and detects an approaching vehicle that comes from an opposite direction, the front LTA sends a left-turn alarm to alert other vehicles to the driver's intent to make a left turn. The rear LTA, however, cannot transmit the turn signal through the CAN bus and can merely send an alarm to alert other approaching vehicles after detecting the vehicles. Compared to the front LTA, the rear LTA can be installed in a simple and rapid manner, whereas the rear LTA cannot allow the vehicle to capture the message sent by the front LTA and thus can merely send the left-turn alarm through vehicular ad-hoc network. Accordingly, the rear LTA is very much likely to issue erroneous alarms. In view of the above, how to reduce the erroneous alarms sent by the rear LTA is one of the concerns to be addressed while the vehicular ad-hoc network is applied.

SUMMARY

The disclosure provides a vehicle turning alarm method and a vehicle turning alarm device capable of reducing erroneous alarms sent by a LTA and enhancing alarm-sending accuracy of the rear LTA.

In an exemplary embodiment, a vehicle turning alarm method is provided, and the vehicle turning alarm method includes acquiring map information and vehicle information of a vehicle. The vehicle turning alarm method further includes determining a vehicle status according to the map information and the vehicle information when a vehicle approaches an intersection. The vehicle turning alarm method further includes not sending an alert message if the vehicle status is not a left-turning event.

In an exemplary embodiment, a vehicle turning alarm device that includes a data capturing unit, a storage unit, a processing unit, and a communication unit is provided. The data capturing unit is configured to acquire vehicle information of a vehicle. The storage unit is configured to store map information. The processing unit is configured to process the vehicle information and the map information. The communication unit is configured to send an alert message. The processing unit acquires the map information from the storage unit and acquires the vehicle information from the data capturing unit. If the processing unit detects that the vehicle approaches an intersection, the processing unit determines a vehicle status according to the map information and the vehicle information. If the vehicle status is not a left-turning event, the processing unit does not instruct the communication unit to send the alert message.

In light of the foregoing, according to the vehicle turning alarm method and the vehicle turning alarm device provided herein, it is determined whether the vehicle status is a left-turning event according to the map information and the vehicle information. If the vehicle status is not the left-turning event, no alert message is sent, so as to reduce the erroneous alarms sent by the rear LTA.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
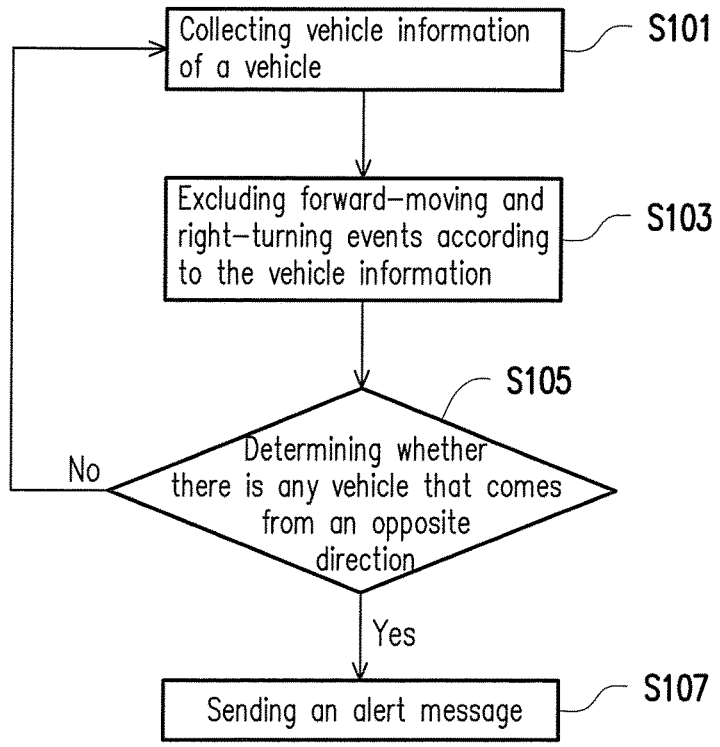
FIG. 1 is a flowchart illustrating a vehicle turning alarm method according to an exemplary embodiment of the disclosure.

FIG. 1 is a flowchart illustrating a vehicle turning alarm method according to an exemplary embodiment of the disclosure.

With reference to FIG. 1, in step S101, vehicle information (e.g., movement trajectories) of a vehicle is collected. In step S103, forward-moving and right-turning events are excluded according to the vehicle information. In step S105, it is determined whether there is any other vehicle that comes from an opposite direction; if there is no vehicle coming from the opposite direction, go back to step S101 to continuously collect the vehicle information of the vehicle. If any vehicle that comes from the opposite direction is detected in step S105, in step S107, an alert message is sent to the vehicle that comes from the other direction for a left-turning event acquired from the vehicle information. According to the vehicle turning alarm method provided above, the forward-moving and right-turning events can be excluded from the vehicle information, and the alert message is merely sent for the left-turning event, so as to reduce the erroneous alarms sent by the rear LTA.

Figure 2:
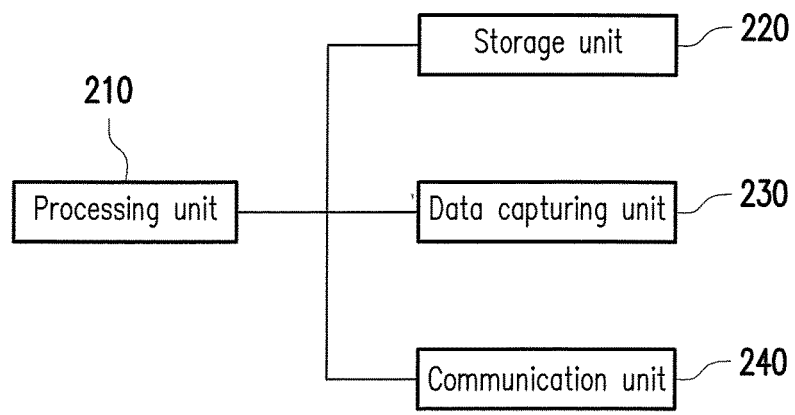
FIG. 2 is a block diagram illustrating a vehicle turning alarm device according to an exemplary embodiment of the disclosure.

FIG. 2 is a block diagram illustrating a vehicle turning alarm device according to an exemplary embodiment of the disclosure.

With reference to FIG. 2, in an exemplary embodiment, a vehicle turning alarm device 200 includes a processing unit 210, a storage unit 220, a data capturing unit 230, and a communication unit 240. The processing unit 210 is, for instance, a central processing unit (CPU), an embedded controller, a microprocessor, an application specific integrated circuit (ASIC), a programmable logic device (PLD), or any other similar device.

The storage unit 220 is, for instance, a secure digital (SD) card, a multimedia card (MMC), a memory stick, a compact flash (CF) card, an embedded MMC (eMMC), a solid state disk (SSD), or any other small memory storage device.

The data capturing unit 230 includes a sensor unit (not shown in the drawings) and a positioning unit (not shown in the drawings). The sensor unit is, for instance, an inertial measurement unit (IMU) sensor that can collect tri-axial acceleration data, gyroscope data, and magnetometer data. The positioning unit is, for instance, a global positioning system (GPS) device that can receive longitudinal data and latitudinal data of a current location.

The communication unit 240 is, for instance, a communication chip that can perform communication functions in a wireless manner or through a cable.

In the present exemplary embodiment, the data capturing unit 230 is able to acquire vehicle information of a vehicle, and the vehicle information includes the speed of the vehicle, the tri-axial acceleration data, the gyroscope data, the magnetometer data, the longitudinal data, and the latitudinal data. The storage unit 220 is able to store map information that may includes route information and intersection information.

If the processing unit 210 detects that the vehicle approaches an intersection, the processing unit 210 determines a vehicle status according to the map information and the vehicle information and determines whether to send an alert message according to the vehicle status.

Specifically, the processing unit 210 acquires a road curvature according to the map information and acquires a movement curvature according to the vehicle information. If the difference between the movement curvature and the road curvature is greater than a curvature threshold, and the speed of the vehicle is less than or equal to a speed threshold, the processing unit 210 determines the vehicle status is the left-turning event and sends the alert message. If the difference between the movement curvature and the road curvature is less than or equal to the curvature threshold, or if the difference between the movement curvature and the road curvature is greater than the curvature threshold and the speed of the vehicle is greater than the speed threshold, the processing unit 210 determines the vehicle status is not the left-turning event and thus does not send the alert message. The method of acquiring the movement curvature is elaborated below.

In the present exemplary embodiment, if the processing unit 210 detects that the vehicle approaches the intersection, the processing unit 210 determines the vehicle status according to the map information and the vehicle information; however, the disclosure is not limited thereto. For instance, in another exemplary embodiment, if the processing unit 210 determines that the vehicle approaches the intersection and detects the approaching vehicle that comes from an opposite direction, the processing unit 210 determines the vehicle status according to the map information and the vehicle information. As such, given that no approaching vehicle that comes from the opposite direction is detected, even though the driver of the vehicle makes a left turn, the vehicle turning alarm device provided herein does not send any alert message, so as not to bother the driver of the vehicle.

Note that the processing unit 210 further smoothes the tri-axial acceleration data, the gyroscope data, and the magnetometer data and corrects errors in the GPS data according to the route information. For instance, if the location of the vehicle deviates from the route according to the GPS data, and the vehicle enters an area of a building, the processing unit 210 can correct the location of the vehicle and direct the vehicle to a neighboring route according to the map information.

Figure 3:
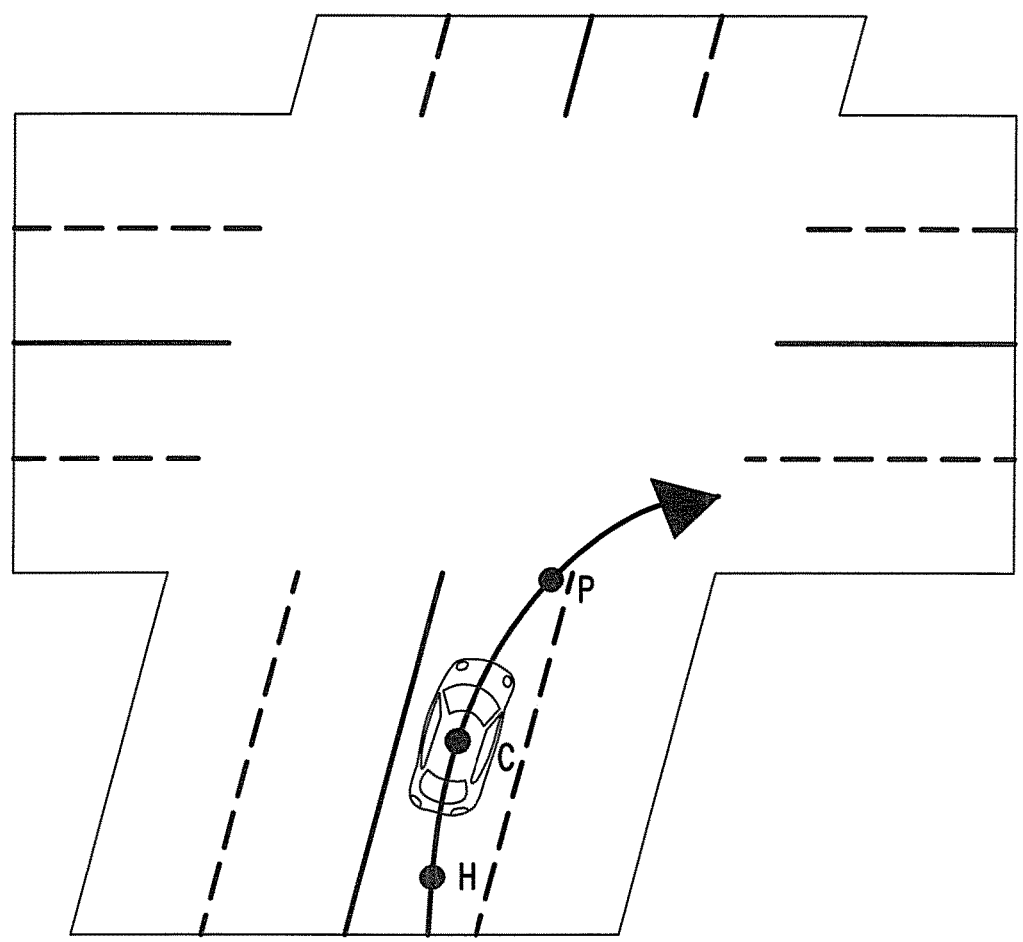
FIG. 3 is a schematic diagram illustrating a predicted route of a vehicle according to an exemplary embodiment of the disclosure.

FIG. 3 is a schematic diagram illustrating a predicted route of a vehicle according to an exemplary embodiment of the disclosure.

With reference to FIG. 3, in the event of calculating the movement curvature, the processing unit 210 acquires a current location C and a previous location H and estimates a predicted location P according to the speed of the vehicle, the tri-axial acceleration data, the gyroscope data, and the magnetometer data. The way to estimate the predicted location P is elaborated hereinafter. After the predicted location P is obtained, the processing unit 210 is able to calculate the movement curvature according to a curvature equation. The curvature equation is shown below:

$$\text{Movement curvature} = \frac{2\sin\angle HCP}{HP}$$

Figure 4:
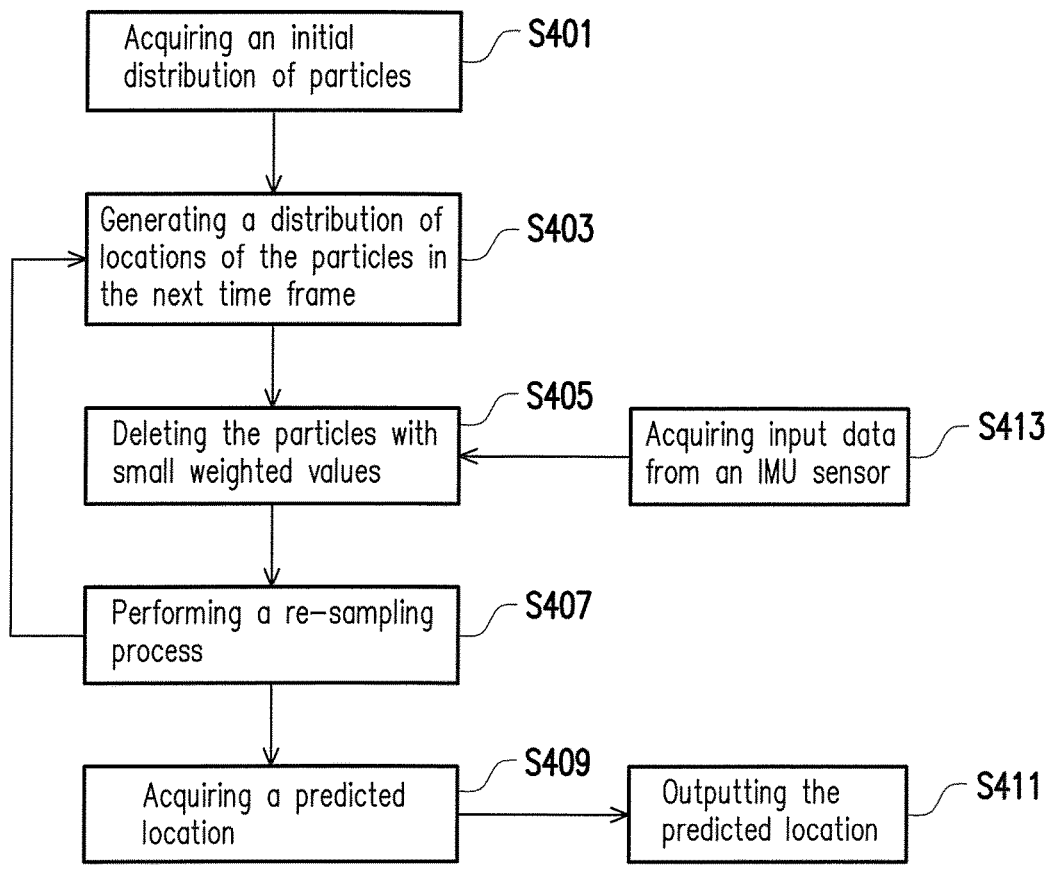
FIG. 4 is a flowchart illustrating a predicted location according to an exemplary embodiment of the disclosure.

FIG. 4 is a flowchart illustrating a predicted location according to an exemplary embodiment of the disclosure. FIG. 5A-FIG. 5D are schematic diagrams illustrating a predicted location according to an exemplary embodiment of the disclosure.

Figure 5A:
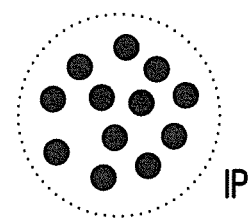
FIG. 5A-FIG. 5D are schematic diagrams illustrating a predicted location according to an exemplary embodiment of the disclosure.

With reference to FIG. 4 and FIG. 5A-FIG. 5D, in step S401, an initial distribution of particles is acquired. Particularly, the processing unit 210 determines an error range according to a plurality of data error values of an IMU sensor of the vehicle information. The error range includes a plurality of normally distributed particles, and the location of the vehicle is represented by the average of locations of all initial particles IP, as shown in FIG. 5A.

Figure 5B:
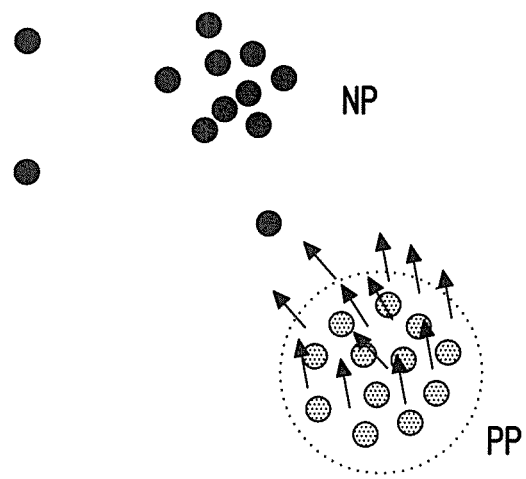
Figure 5C:
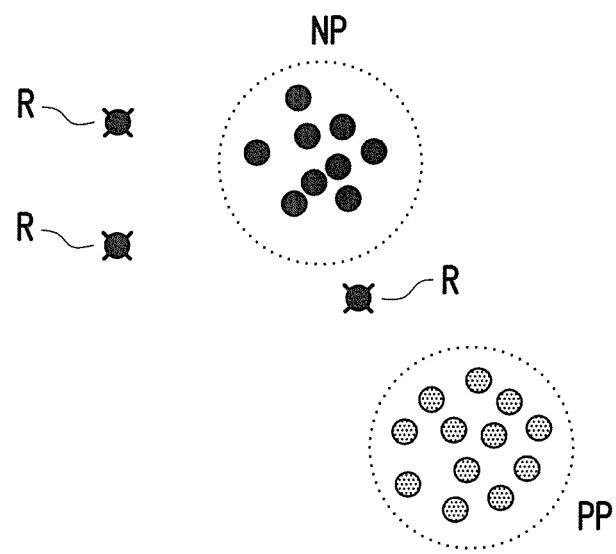
Figure 5D:
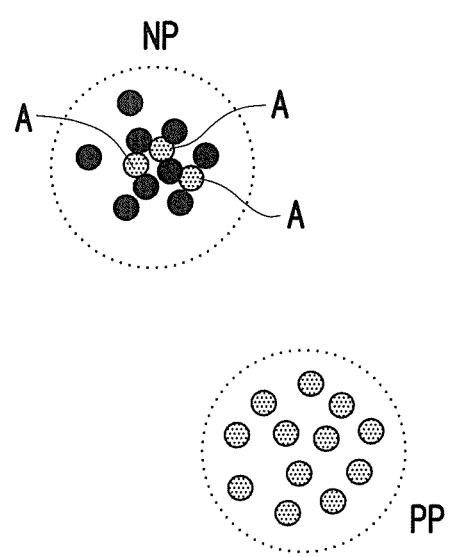

In step S403, a distribution of locations of the particles in the next time frame is generated. For instance, as shown in FIG. 5B, the initial particles IP shown in FIG. 5A serve as the particles PP in the previous time frame, and each of the particles PP estimates the distribution of the locations of the particles in the next time frame according to data of the IMU sensor, so as to generate the particles NP in the next time frame. The estimated location of the vehicle in the next time frame is represented by the average of the locations of all of the particles NP in the next time frame.

In step S405, the particles with small weighted values are deleted. For instance, in FIG. 5C, the processing unit 210 calculates the weighted values of all of the particles NP in the next time frame NP and deletes all of the particles NP having the weighted values smaller than a first threshold. In particular, the processing unit 210 may calculate the distance from each of the particles NP in the next time frame to the other particles NP and thereby calculate the weighted value of each of the particles NP. The particles far from the majority of the particles NP may have the small weighed values. As such, the particles R far from the majority of the particles NP can be deleted.

In step S407, a re-sampling process is performed. Specifically, in order to ensure the sufficient quantity of the particles NP in the next time frame, the processing unit 210 is required to perform the re-sampling process, so as to prevent the decrease in the quantity of the particles. The processing unit 210 may choose the particles NP with the large weighted values as the sample particles, i.e., choose the particles NP having the weighted values greater than a second threshold, and the processing unit 210 then adds particles A, such that the distribution of the newly added particles A is within the error range.

In step S409, the processing unit 210 acquires the predicted location according to the particles NP that are not deleted in step S405 and the particles A added in step S407; in step S411, the processing unit 210 outputs the predicted location. After the re-sampling process is completed in step S407, step S409 may be performed to obtain the predicted location; in addition, step S403 is further performed to continuously estimate the location of the vehicle in the next time frame.

Note that the input data may be further obtained from the IMU sensor in step S413, so as to perform step S405 of deleting the particles with the small weighted values.

How to calculate the movement curvature of the predicted route of the vehicle is explained above, and how to calculate the difference between the movement curvature and the road curvature is described below.

Figure 6:
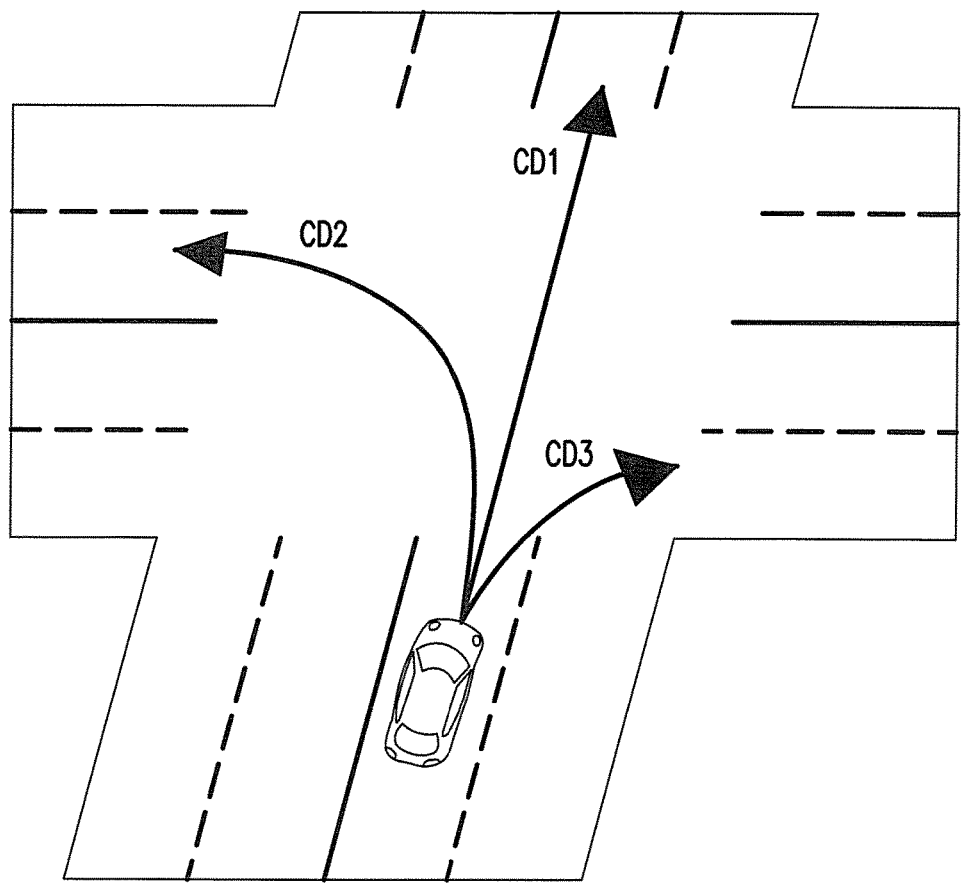
FIG. 6 is a schematic diagram illustrating a curvature difference according to an exemplary embodiment of the disclosure.

FIG. 6 is a schematic diagram illustrating a curvature difference according to an exemplary embodiment of the disclosure.

As depicted in FIG. 6, in the present exemplary embodiment, the vehicle may have three different movement trajectories when passing the intersection. If the vehicle goes straight forward, the curvature difference CD1 is zero. If the vehicle turns left, the curvature difference CD2 is positive. If the vehicle turns right, the curvature difference CD3 is negative. The equation of obtaining the curvature difference is provided below:

$$\kappa_1 = (\Delta D_1(\text{vehicle}) - \Delta D_1(\text{road}))/\Delta D(\text{vehicle}) = \Delta D_1(\text{vehicle})/\Delta D(\text{vehicle}) - \Delta D_1(\text{road})/\Delta D(\text{vehicle})$$

In particular, the curvature difference $\kappa_1$ represents the value obtained from dividing a horizontal moving range relative to a central line on the road by a moving distance of the vehicle. In one time frame, the shifting distance of the vehicle going straight forward in the time frame is subtracted from the horizontal moving distance difference from the beginning of moving the vehicle to the end of moving the vehicle, and the resultant value is divided by the length of the road where the vehicle has been traveling, so as to acquire the movement curvature in the time frame. The curvature difference $\kappa_1$ can be calculated by subtracting the road curvature from the movement curvature.

Figure 7:
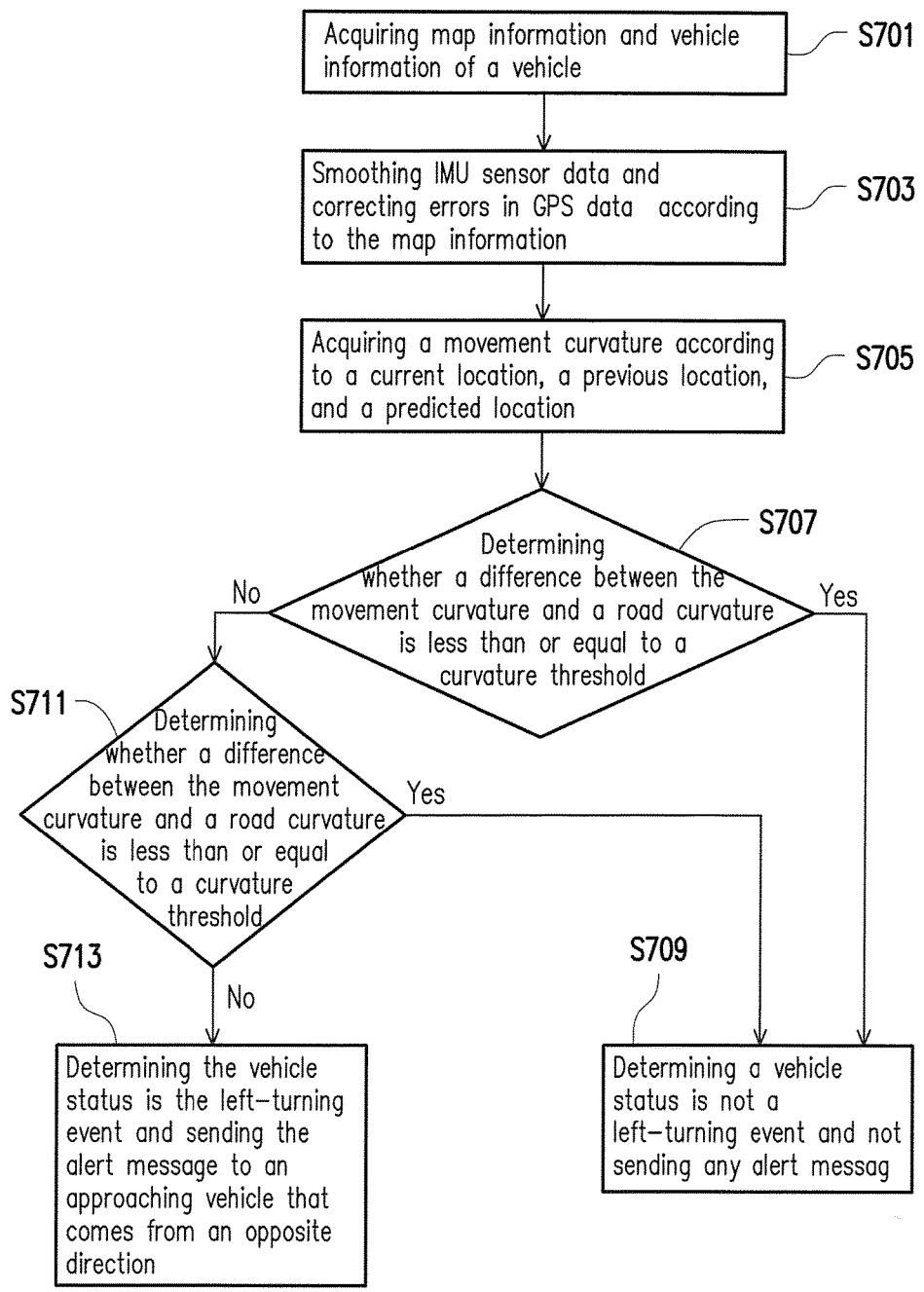
FIG. 7 is a flowchart illustrating a vehicle turning alarm method according to an exemplary embodiment of the disclosure.
Figure 8:
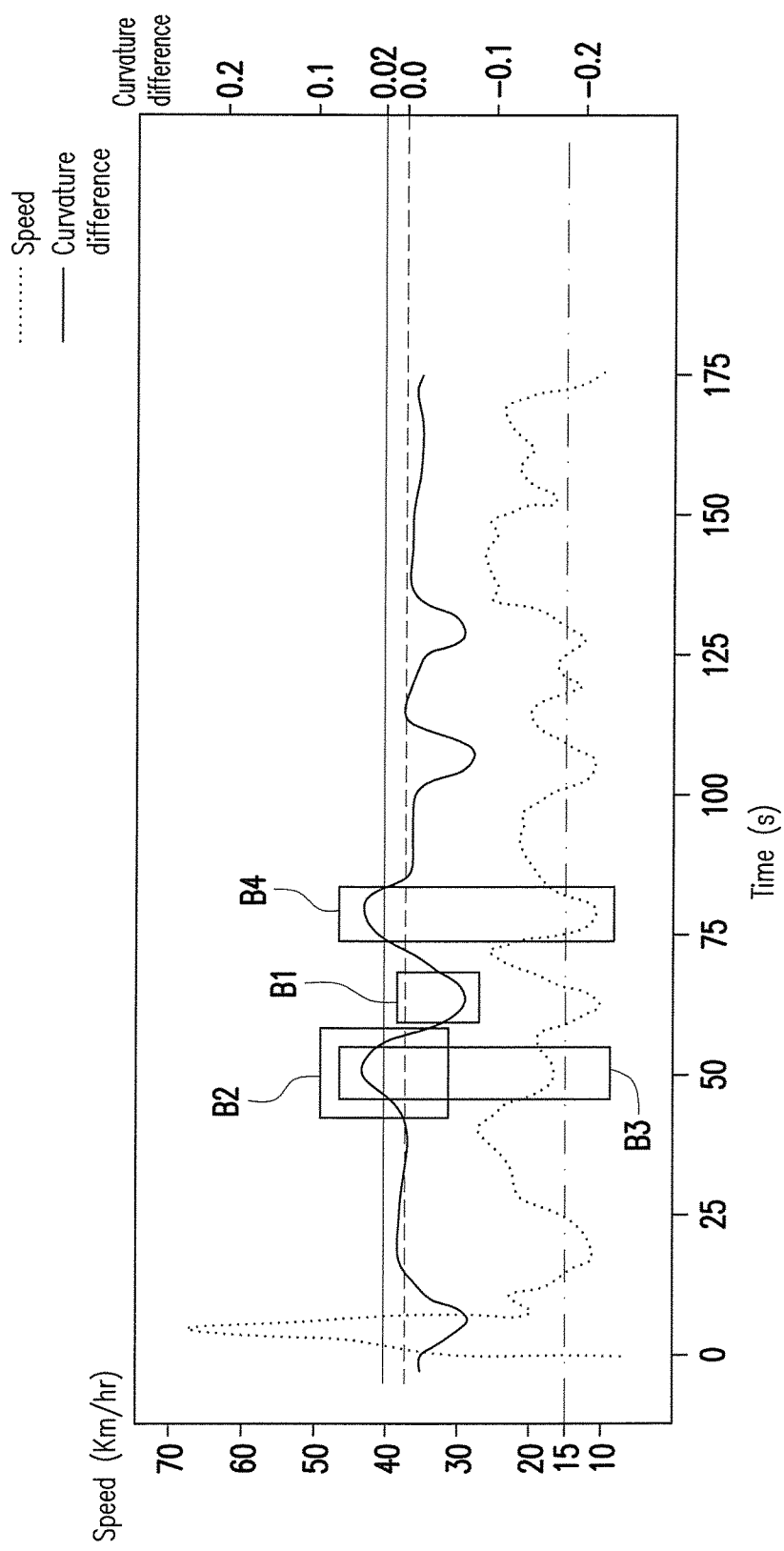
FIG. 8 is a schematic diagram illustrating a correlation between a speed and a curvature of a predicted route of a vehicle according to an exemplary embodiment of the disclosure.

FIG. 7 is a flowchart illustrating a vehicle turning alarm method according to an exemplary embodiment of the disclosure. FIG. 8 is a schematic diagram illustrating a correlation between a speed and a curvature of a predicted route of a vehicle according to an exemplary embodiment of the disclosure.

With reference to FIG. 7, in step S701, the map information and the vehicle information of the vehicle are acquired. The vehicle information of the vehicle includes the tri-axial acceleration data, the gyroscope data, and the magnetometer data of the IMU sensor as well as the longitudinal data and the latitudinal data of the GPS device.

In step S703, the data of the IMU sensor are smoothed, and errors in the GPS data are corrected according to the map information.

In step S705, the movement curvature is acquired according to the current location, the previous location, and the predicted location. The predicted location is estimated by means of a particle filter according to the speed of the vehicle, the tri-axial acceleration data, the gyroscope data, and the magnetometer data.

In step S707, it is determined whether the difference between the movement curvature and the road curvature is less than or equal to the curvature threshold. If the difference between the movement curvature and the road curvature is less than or equal to the curvature threshold, it is determined that the vehicle status is not the left-turning event in step S709, and no alert message is sent. With reference to FIG. 8, the horizontal axis represents the time frame during which the vehicle is traveling, and the vertical axis represents both the speed of the vehicle and the curvature difference. The speed of the vehicle recorded in FIG. 8 is represented by dotted lines, and the curvature difference is depicted by a solid line. The dotted chain line in the bottom portion of FIG. 8 represents the speed threshold, and the speed threshold is set as 15 in the present exemplary embodiment. The speed threshold above is calculated according to the linear motion formula $V^2 = V_0^2 + 2aS$ and $Ts = a*t$, wherein Ts is the speed threshold. It is assumed that the maximum speed limit is 40 km/hr, and the minimum braking distance (from the point where the brakes of the vehicle are applied to the point where the vehicle comes to a complete stop) is 15 meters. In this case, if it is intended to reduce the speed of the vehicle to zero (i.e., 0 m/hr), the speed reducing rate of 4.1 (m/s$^2$) can be calculated according to the above formulas. It is further assumed that the response time of the driver is 1 second, and Ts=4.1 (m/s$^2$)*1 (s)=4.1 (m/s)=14.76 (km/hr). That is, the speed threshold is approximately equal to 15 km/hr.

The dotted straight line along the horizontal axis and close to the center portion of FIG. 8 represents that the curvature difference is 0. The solid straight line along the horizontal axis and close to the center portion of FIG. 8 represents the curvature threshold. In the present exemplary embodiment, the curvature threshold is set to be 0.02. The curvature threshold is determined according to experimental results, which will be elaborated below. In the block B1 of FIG. 8, the curvature difference is less than the curvature threshold (0.02); therefore, it is determined that the vehicle status is not the left-turning event, and no alert message is sent.

With reference to FIG. 7, if the difference between the movement curvature and the road curvature is greater than the curvature threshold (e.g., in the block B2 of FIG. 8), whether the speed of the vehicle is greater than the speed threshold is further determined in step S711. If the difference between the movement curvature and the road curvature is greater than the curvature threshold, and the speed of the vehicle is greater than the speed threshold, e.g., as shown in the block B3 of FIG. 8, it is determined that the vehicle status is not the left-turning event in step S709, and no alert message is sent. If the difference between the movement curvature and the road curvature is greater than the curvature threshold, and the speed of the vehicle is less than or equal to the speed threshold, e.g., as shown in the block B4 of FIG. 8, it is determined that the vehicle status is the left-turning event in step S713, and the alert message is sent to the approaching vehicle that comes from the opposite direction.

In the present exemplary embodiment, if the difference between the movement curvature and the road curvature is greater than the curvature threshold, whether the speed of the vehicle is greater than the speed threshold is determined in step S711. However, the disclosure is not limited thereto. In another exemplary embodiment, if the difference between the movement curvature and the road curvature is greater than the curvature threshold, whether the curvature difference is greater than a threshold of a drifting curvature difference can be further determined, and the threshold of the drifting curvature difference can be set as twice the curvature threshold. If the curvature difference is greater than the threshold of the drifting curvature difference, it is determined in step S713 that the vehicle is about to turn and drift at a high speed and the vehicle status is the left-turning event, and the alert message is sent to the approaching vehicle that comes from the opposite direction.

In the disclosure, different curvature thresholds are given to obtain the actual test results of predicting whether the vehicle turns left or not, as shown in Table 1 to Table 4 below. In Table 1 to Table 4, the curvature thresholds are −0.02, 0, 0.02, and 0.04, and the test results are obtained on three different routes (i.e., routes A, B, and C). Here, the true positive event means that the vehicle is predicted to turn left and actually turns left, the false negative event means that the vehicle is predicted to turn left but does not turn left, and the false positive event means that the vehicle is not predicted to turn left but actually turns left.

TABLE 1

|  | Route A | Route B | Route C | Total | Incidence rate |
|---|---|---|---|---|---|
| True Positive | 10 | 11 | 5 | 26 | 54.17% |
| False Negative | 0 | 0 | 0 | 0 | 0% |
| False Positive | 4 | 9 | 9 | 22 | 45.83% |
| Total | 14 | 20 | 14 | 48 | 100% |

TABLE 2

|  | Route A | Route B | Route C | Total | Incidence rate |
|---|---|---|---|---|---|
| True Positive | 10 | 11 | 5 | 26 | 78.79% |
| False Negative | 0 | 0 | 0 | 0 | 0% |
| False Positive | 1 | 3 | 3 | 7 | 21.21% |
| Total | 11 | 14 | 8 | 33 | 100% |

TABLE 3

|  | Route A | Route B | Route C | Total | Incidence rate |
|---|---|---|---|---|---|
| True Positive | 10 | 10 | 5 | 25 | 89.29% |
| False Negative | 0 | 1 | 0 | 1 | 3.57% |
| False Positive | 0 | 1 | 1 | 2 | 7.14% |
| Total | 10 | 12 | 6 | 28 | 100% |

TABLE 4

|  | Route A | Route B | Route C | Total | Incidence rate |
|---|---|---|---|---|---|
| True Positive | 8 | 6 | 4 | 18 | 66.67% |
| False Negative | 2 | 5 | 1 | 8 | 29.63% |
| False Positive | 0 | 0 | 1 | 1 | 3.70% |
| Total | 10 | 11 | 6 | 27 | 100% |

According to Table 1 to Table 4, the smaller the curvature threshold, the higher the rate of sending the erroneous alert messages (even though the failure to send the alert messages can be precluded). On the contrary, if the curvature threshold is set to be large, the rate of sending the erroneous alert messages can be reduced, which may however lead to the failure to send the alert messages. Accordingly, if the curvature threshold is set to be 0.02, the sum of the incidence rates of the false negative events and the false positive events can have the minimum value, and the incidence rate of the true positive events can reach 89.29%, which is the most accurate value among all of the set values.

To sum up, according to the vehicle turning alarm method and the vehicle turning alarm device provided herein, it is determined whether the vehicle status is the left-turning event according to the map information and the vehicle information. If the difference between the movement curvature and the road curvature is greater than the curvature threshold, and the speed of the vehicle is less than or equal to the speed threshold, it is determined that the vehicle status is the left-turning event, and the alert message is sent to the approaching vehicle that comes from the opposite direction. If the difference between the movement curvature and the road curvature is less than or equal to the curvature threshold, or if the difference between the movement curvature and the road curvature is greater than the curvature threshold and the speed of the vehicle is greater than the speed threshold, it is determined that the vehicle status is not the left-turning event, and thus no alert message is sent, so as to reduce the erroneous alarms sent by the rear LTA.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A vehicle turning alarm method comprising:
  acquiring map information and vehicle information of a vehicle;
  determining a vehicle status is a left-turning event or not according to the map information and the vehicle information by a processing unit when the processor detects that the vehicle approaches an intersection; and
  not sending an alert message by a communication unit if the vehicle status is not the left-turning event.

2. The vehicle turning alarm method of claim 1, further comprising:
acquiring a road curvature according to the map information and acquiring a movement curvature according to the vehicle information by the processing unit; and
if a difference between the movement curvature and the road curvature is less than or equal to a curvature threshold, or if the difference between the movement curvature and the road curvature is greater than the curvature threshold and a speed of the vehicle is greater than a speed threshold, determining the vehicle status is not the left-turning event by the processing unit.

3. The vehicle turning alarm method of claim 2, further comprising:
if the difference between the movement curvature and the road curvature is greater than the curvature threshold, and the speed of the vehicle is less than or equal to the speed threshold, determining the vehicle status is the left-turning event and sending the alert message by the communication unit.

4. The vehicle turning alarm method of claim 2, wherein the step of acquiring the movement curvature according to the vehicle information comprises:
acquiring a current location, a previous location, and a predicted location according to the vehicle information and acquiring the movement curvature according to the current location, the previous location, and the predicted location.

5. The vehicle turning alarm method of claim 4, wherein the step of acquiring the predicted location according to the vehicle information comprises:
determining an error range according to a plurality of data error values of an inertial measurement unit sensor of the vehicle information, wherein the error range comprises a distribution of a plurality of normally distributed particles;
generating a plurality of estimated particles at a plurality of estimated locations, the estimated particles corresponding to the normally distributed particles; and
calculating weighted values of the estimated particles, wherein the weighted values of the estimated particles are related to distances among the estimated particles.

6. The vehicle turning alarm method of claim 5, wherein the step of acquiring the predicted location according to the vehicle information further comprises:
deleting the estimated particles having the weighted values smaller than a first threshold;
choosing the estimated particles having the weighted values greater than a second threshold as samples and adding a plurality of newly added particles, such that a distribution of the newly added particles is within the error range of the estimated particles; and
acquiring the predicted location according to the estimated particles and the newly added particles.

7. The vehicle turning alarm method of claim 1, wherein the step of acquiring the vehicle information of the vehicle further comprises:
acquiring data of an inertial measurement unit sensor and receiving global positioning system data, wherein the data of the inertial measurement unit sensor comprises tri-axial acceleration data, gyroscope data, and magnetometer data, and the global positioning system data comprises longitudinal data and latitudinal data.

8. The vehicle turning alarm method of claim 7, wherein the step of acquiring the data of the inertial measurement unit sensor and receiving the global positioning system data comprises:
smoothing the data of the inertial measurement unit sensor; and
correcting errors in the global positioning system data according to the map information.

9. The vehicle turning alai in method of claim 1, wherein the step of determining the vehicle status according to the map information and the vehicle information when the processing unit detects that the vehicle approaches the intersection comprises:
determining the vehicle status according to the map information and the vehicle information when the processing unit determines that the vehicle approaches the intersection and detects an approaching vehicle coming from an opposite direction.

10. A vehicle turning alarm device comprising:
a data capturing unit configured to acquire vehicle information of a vehicle;
a storage unit configured to store map information;
a processing unit configured to process the vehicle information and the map information; and
a communication unit configured to send an alert message,
wherein the processing unit acquires the map information from the storage unit and acquires the vehicle information from the data capturing unit,
if the processing unit detects the vehicle approaches an intersection, the processing unit determines a vehicle status according to the map information and the vehicle information, and
if the vehicle status is not a left-turning event, the processing unit does not instruct the communication unit to send the alert message.

11. The vehicle turning alarm device of claim 10, wherein the processing unit acquires a road curvature according to the map information and acquires a movement curvature according to the vehicle information, and
if a difference between the movement curvature and the road curvature is less than or equal to a curvature threshold, or if the difference between the movement curvature and the road curvature is greater than the curvature threshold and a speed of the vehicle is greater than a speed threshold, the processing unit determines the vehicle status is not the left-turning event.

12. The vehicle turning alarm device of claim 11, wherein if the difference between the movement curvature and the road curvature is greater than the curvature threshold, and the speed of the vehicle is less than or equal to the speed threshold, the processing unit determines the vehicle status is the left-turning event and instructs the communication unit to send the alert message.

13. The vehicle turning alarm device of claim 11, wherein the processing unit acquires a current location, a previous location, and a predicted location according to the vehicle information and acquires the movement curvature according to the current location, the previous location, and the predicted location.

14. The vehicle turning alarm device of claim 13, wherein the processing unit determines an error range according to a plurality of data error values of an inertial measurement unit sensor of the vehicle information, the error range comprises a distribution of a plurality of normally distributed particles,
the processing unit generates a plurality of estimated particles corresponding to the normally distributed particles at a plurality of estimated locations, the processing unit calculates weighted values of the estimated particles, and the weighted values of the estimated particles are related to distances among the estimated particles.

15. The vehicle turning alarm device of claim 14, wherein the processing unit deletes the estimated particles having the weighted values smaller than a first threshold, the processing unit chooses the estimated particles having the weighted values greater than a second threshold as samples and adds a plurality of newly added particles, such that a distribution of the newly added particles is within the error range of the estimated particles, and the processing unit acquires the predicted location according to the estimated particles and the newly added particles.

16. The vehicle turning alarm device of claim 10, wherein the data capturing unit acquires data of an inertial measurement unit sensor and receives global positioning system data, the data of the inertial measurement unit sensor comprises tri-axial acceleration data, gyroscope data, and magnetometer data, and the global positioning system data comprises longitudinal data and latitudinal data.

17. The vehicle turning alarm device of claim 16, wherein the processing unit smoothes the data of the inertial measurement unit sensor, and the processing unit corrects errors in the global positioning system data according to the map information.

18. The vehicle turning alarm device of claim 10, wherein the processing unit determines the vehicle status according to the map information and the vehicle information if the processing unit determines the vehicle approaches the intersection and detects an approaching vehicle coming from an opposite direction.

* * * * *